(No Model.)
W. G. LATIMER.
SPEED INDICATING ALARM.
No. 553,121. Patented Jan. 14, 1896.
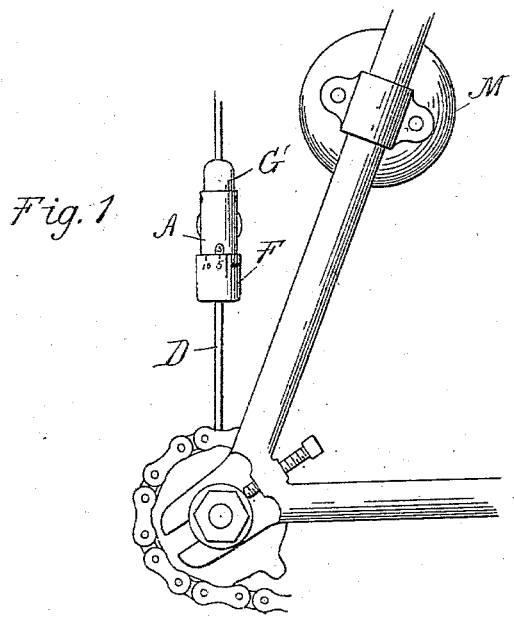
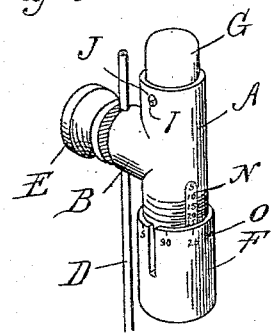
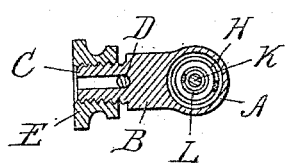
Witnesses:
P. M. Hulbert
O. F. Barthel
Inventor:
William G. Latimer
By ...........
Attys.

UNITED STATES PATENT OFFICE.

WILLIAM G. LATIMER, OF DETROIT, MICHIGAN.

SPEED-INDICATING ALARM.

SPECIFICATION forming part of Letters Patent No. 553,121, dated January 14, 1896.

Application filed July 18, 1895. Serial No. 556,347. (No model.)

*To all whom it may concern:*

Be it known that I, WILLIAM G. LATIMER, a citizen of the United States, residing at Detroit, in the county of Wayne and State of Michigan, have invented certain new and useful Improvements in Alarm Devices, of which the following is a specification, reference being had therein to the accompanying drawings.

The invention consists in the construction of a device which will indicate when the speed of a vehicle, such as a bicycle, has reached a certain desired speed, and particularly in an alarm device, such as a bell, and a movable weight on the wheel, normally out of the path of the bell and adapted to be moved into operative relation thereto by centrifugal force in the rotation of the wheel.

The invention further consists in the construction, arrangement and combination of the various parts, all as more fully hereinafter described.

In the drawings, Figure 1 is a side elevation of my device, showing it as applied to the rear wheel of a bicycle of ordinary construction. Fig. 2 is a perspective view of the weight-casing. Fig. 3 is a vertical central section therethrough. Fig. 4 is a horizontal section on line $x$ $x$.

A is a casing preferably cylindrical and having means for securing it to the wheel. I have shown it provided with an offset B having a split screw-threaded end section C, adapted to embrace one of the spokes D of the ordinary bicycle-wheel and be secured thereon by means of the nut E, as plainly shown in Figs. 2 and 4. This casing has adjustably secured to its inner end the head or cap F. I have shown this in the form of a cylindrical cap engaging an end screw-threaded portion on the casing.

G is a weighted slide engaged in the outer end of the casing and projecting slightly beyond the same. This weight is secured to the head F by means of a coiled spring H, which at its upper end is secured to the boss $a$ on the weight and at its lower end to the boss $b$ on the head. This spring acts with its tension to hold the weight G from moving outward. The weight preferably has a limited movement and I have shown the movement limited by means of a pin I on the weight engaging apertures J in the casing. The weight preferably has a stem K extending down into the casing and forming a guide or support for the second spring L, which is under compression between the weight and the cap, this spring being a lighter spring than the spring H.

M is a bell or other indicator secured on the frame in any suitable manner, normally out of the path of the weight G, but in such relation thereto that when the wheel is rotated at a given speed the centrifugal force will move the weight G out against the tension of the spring H and strike the bell, thereby indicating that a certain speed is attained by the vehicle. The head F may be adjusted in and out to vary the tension of the springs and thus determine the speed at which the weight may be moved out sufficiently to sound the limit by having the two oppositely-working springs, as described. The adjustment may be accomplished with much less movement, as an adjustment to lessen the force of the springs not only decreases the holding action of the spring H, but also increases the pushing action or the compression of the spring L.

By placing the scale N on the casing A and suitable indicating-marks O on the cap F, the rider may set the device to ring the bell at any desired rate of speed, and thus without impeding the motion of the bicycle can indicate when it has arrived at the desired speed. Riders find it a great convenience in going on trips where they desire to reach the place at a certain time to travel at a substantially uniform speed, and this enables them to accurately determine the miles per hour at which they are going, and by a quick adjustment they may increase or decrease their speed when desired.

While I have shown a specific construction for carrying out my invention, I do not desire to be limited thereto, as I believe I am the first to apply a movable weight to a revolving wheel of a vehicle which will indicate when a given speed has been reached.

What I claim as my invention is—

1. The combination in a vehicle and a wheel thereof, of an alarm device, a sliding weight adjustably clamped on the wheel normally out of the plane of the alarm device, but adapted to be moved into operative relation thereto by centrifugal force in the revolution of the wheel.

2. The combination with the bicycle frame and a wheel, of an alarm device, a spring controlled movable weight removably secured on the wheel normally out of the plane of the alarm device, but adapted to be moved into operative relation therewith by centrifugal force in the revolution of the wheel.

3. The combination with the frame and a wheel, of an alarm device on the frame, such as a bell, a weight on the wheel, slidingly supported in radial bearings, a spring to hold the weight from outward movement and means for adjusting the tension of the spring.

4. The combination with the frame, and a wheel, of a bell on the frame, a casing secured to one of the spokes of the wheel, an adjustable head at one end of the casing, a weight slidingly secured in the casing, and a spring secured to the weight and the head at its opposite ends.

5. The combination with the frame, and a wheel, of a bell on the frame, a casing secured to one of the spokes of the wheel, an adjustable head at one end, a weight slidingly secured in the opposite end, a spring secured at its opposite ends to the weight and the head acting to hold the weight against outward movement, and a second lighter spring under compression between the weight and head, substantially as and for the purpose described.

6. In a speed alarm device, the combination with a wheel revolving in a vertical plane, of an alarm device supported on a stationary support, a weighted body slidingly mounted on the wheel and at substantially right angles to the axis thereof, whereby the movement of the wheel imparts a radial centrifugal movement to the body and forces the same into contact with the alarm device, and means extending laterally beyond its support for securing the movable body to the support, substantially as described.

7. In a speed alarm device, the combination with a wheel revolving in a vertical plane, of an alarm device fixedly supported, a weighted body carried by the wheel and at substantially right angles to the axis thereof, whereby the movement of the wheel imparts a radial centrifugal movement to the body, and forces the same into contact with the alarm device, and means for adjustably securing the body to the spokes of the wheel, substantially as described.

In testimony whereof I affix my signature in presence of two witnesses.

WILLIAM G. LATIMER.

Witnesses:
JAS. WHITTEMORE,
M. B. O'DOGHERTY.